(12) United States Patent
Khripkov et al.

(10) Patent No.: US 11,217,903 B2
(45) Date of Patent: Jan. 4, 2022

(54) ANTENNA SYSTEM FOR A WIRELESS COMMUNICATION DEVICE

(71) Applicant: HUAWEI TECHNOLOGIES CO., LTD., Guangdong (CN)

(72) Inventors: Alexander Khripkov, Helsinki (FI); Linsheng Li, Kista (SE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/757,821

(22) PCT Filed: Nov. 15, 2017

(86) PCT No.: PCT/EP2017/079321
§ 371 (c)(1),
(2) Date: Apr. 21, 2020

(87) PCT Pub. No.: WO2019/096376
PCT Pub. Date: May 23, 2019

(65) Prior Publication Data
US 2021/0194153 A1  Jun. 24, 2021

(51) Int. Cl.
*H01Q 1/24* (2006.01)
*H01Q 21/06* (2006.01)
(Continued)

(52) U.S. Cl.
CPC .......... *H01Q 21/064* (2013.01); *H01Q 1/243* (2013.01); *H01Q 13/085* (2013.01); *H01Q 13/10* (2013.01); *H04W 16/28* (2013.01)

(58) Field of Classification Search
CPC .... H01G 21/064; H01G 1/243; H01G 13/085; H01G 13/10
See application file for complete search history.

(56) References Cited

U.S. PATENT DOCUMENTS

2005/0219126 A1   10/2005   Rebeiz et al.
2014/0240186 A1    8/2014   Zhou et al.
(Continued)

FOREIGN PATENT DOCUMENTS

CN    204947073 U    1/2016
CN    106129594 A    11/2016
(Continued)

OTHER PUBLICATIONS

R4-1703345 Huawei, HiSilicon, "On mmWave UE reference architecture for EIS assumption", 3GPP TSG-RAN WG4 Meeting #82b, Spokane, Washington, USA, Apr. 3-7, 2017 (2 pages).
(Continued)

*Primary Examiner* — Graham P Smith
(74) *Attorney, Agent, or Firm* — Westerman, Hattori, Daniels & Adrian, LLP

(57) ABSTRACT

An antenna system for a mobile device includes a first trough antenna element formed by a first planar conductive member, a second conductive member spaced apart from the first planar conductive member; and a back wall member disposed between the first planar conductive member and the second conductive member. A first slot antenna is formed in the first planar conductive member and the second conductive member adjacent to the first trough antenna element.

14 Claims, 16 Drawing Sheets

(51) Int. Cl.
  *H01Q 13/08* (2006.01)
  *H01Q 13/10* (2006.01)
  *H04W 16/28* (2009.01)

(56) References Cited

U.S. PATENT DOCUMENTS

2016/0118713 A1  4/2016  Hong et al.
2016/0211586 A1  7/2016  Hong et al.
2017/0294705 A1* 10/2017  Khripkov ............... H01Q 21/24

FOREIGN PATENT DOCUMENTS

CN  106463838 A  2/2017
KR  20160064842 A  6/2016

OTHER PUBLICATIONS

R4-1702844 Sony, Ericsson, "UE antenna array configuration for mmWave", 3GPP TSG-RAN WG4 Meeting #82 bis , Spokane, Washington, USA, Apr. 3-7, 2017 (8 pages).
R4-1700300 Qualcomm, "WF on UE RF", 3GPP TSG-RAN WG4 NR AH meeting, Spokane, Washington, USA, Jan. 17-19, 2017 (9 pages).
R4-1704366 Qualcomm et al., "WF on mmW antenna ref architecture", 3GPP TSG-RAN WG4 #82bis Meeting, USA, Apr. 3-7, 2017 (5 pages).
R4-1705205 Qualcomm Incorporated, "mmW reference architecture", 3GPP TSG-RAN WG4 #83, Hangzhou, China, May 15-19, 2017 (2 pages).
R4-1706067 Sony et al., "WF on UE Reference Architecture", 3GPP TSG-RAN WG4 RAN4 #83, Hangzhou, China, May 19-25, 2017 (3 pages).
International Search Report dated Aug. 3, 2018, issued in counterpart Application No. PCT/EP2017/079321 (11 pages).
Office Action dated Jan. 22, 2021, issued in counterpart CN Application No. 201780096863.5, with English Translation. (11 pages).
IEEE Std 802.11ad—2012 Part 11: Wireless LAN Medium Access Control (MAC) and Physical Layer (PHY) Specifications Amendment 3: Enhancements for Very High Throughput in the 60 GHz Band, IEEE Computer Society, Dec. 28, 2012 (628 pages).

* cited by examiner

ANTENNA SYSTEM FOR A WIRELESS COMMUNICATION DEVICE

CROSS-REFERENCE TO RELATED APPLICATIONS

This application is a National Stage of International Patent Application No. PCT/EP2017/079321, filed on Nov. 15, 2017, which is hereby incorporated by reference in its entirety.

TECHNICAL FIELD

The aspects of the present disclosure relate generally to wireless communication devices and more particularly to an antenna system for a wireless communication device.

BACKGROUND

The $3^{rd}$ Generation Partnership Project (3GPP) definition of performance parameters for 5G new radio (NR) user equipment (UE) beamforming with multiple-in, multiple out (MIMO) rank requires that 5G user equipment shall use omnicoverage millimeter wave (mmWave) antennas with generally constant Equivalent Isotropically Radiated Power (EIRP)/Effective Isotropic Sensitivity (EIS), diversity/MIMO performance to achieve stable communication in all directions and orientations. The requirements for omnicoverage are defined by enhanced mobile Broad Band (eMBB) dense urban use-cases, where there is a high probability for Line-of-Sight (LOS) between the user equipment and small cell base-stations.

The non-line of sight (NLOS) channel typically has at least 20 dB higher attenuation in comparison with the LOS channel. Therefore, dual layers supported by single polarization user equipment in NLOS will result in degraded data throughput. It would be advantageous to provide a user equipment that supports dual polarization beamforming, enabling dual layers MIMO/diversity in the LOS channel.

Directional phased array antennas can only cover a part of the space. The coverage is provided by steering the beam, but it is still very difficult to achieve a whole sphere coverage using one array. Therefore, it would be advantageous to provide hybrid beamforming in mmWave 5G NR user equipment by switching and phase-controlled antenna elements.

Accordingly, it would be desirable to be able to provide an antenna system for a mobile communication device that addresses at least some of the problems identified above.

SUMMARY

It is an object of the disclosed embodiments to provide an antenna system for a mobile communication device that provides independent antenna elements for multiband multiple-in multiple out (MIMO) operation.

According to a first aspect, the above and further objects and advantages are obtained by an antenna system for a mobile device. In one embodiment, the antenna system includes a first trough antenna element formed by a first planar conductive member; a second conductive member spaced apart from the first planar conductive member; and a back wall member disposed between the first planar conductive member and the second conductive member. A first slot antenna is formed in the first planar conductive member and the second conductive member adjacent to the first trough antenna element. The aspects of the disclosed embodiments provide a high-efficiency polarization-MIMO mmWave antenna system or array. Dual-polarization beamforming is supported, and two orthogonal polarizations are radiated. The antenna system of the disclosed embodiments has greater than approximately 20% relative bandwidth (24.25 GHz-29.5 GHz) and supports omnicoverage beamforming with generally constant EIRP/EIS, diversity/MIMO performance to achieve stable communication in all directions and orientations.

In a possible implementation form of the antenna system according to the first aspect device, a second trough antenna element is formed between the first slot antenna and a second slot antenna adjacent to the second trough antenna element. The trough antenna element acts as wave-traps for radiation from slot antenna element. The trough antenna elements are balancing EM (Electromagnetic) mode-transformation of slot antennas: TM (Transverse Magnetic)-mode (surface-wave) into TEM-mode (radiation into free-space). High-efficiency beamforming is provided by an array of slot antennas, with mutual isolation of less than −15 dB between adjacent slot antennas.

In a possible implementation form of the antenna system according to the first aspect as such or the previous possible implementation form, the first trough antenna element comprises a conductive probe member disposed between the first planar conductive member and the second conductive member and in front of the back wall member. The array of trough antenna elements provides high-efficiency beamforming, with greater than approximately 20% relative bandwidth (24.25-29.5 GHz).

In a further possible implementation form of the antenna system according to the previous possible implementation form, a feed line is connected to the conductive probe to generate an electric field polarized substantially perpendicular to a front outer edge of the first trough antenna elements. Mutual isolation of greater than approximately −15 dB is achieved by orthogonality of current modes between adjacent antennas. The subarray of slot antennas and subarray of trough antennas provide high-efficiency dual-polarization beamforming.

In a further possible implementation form of the antenna system according to the first aspect or according to any one of the preceding possible implementation forms, the first slot antenna is defined by a first boundary edge member, a second boundary edge member and a rear boundary edge member. The first boundary edge member of the first slot antenna forms an edge of the first trough antenna element, and the second boundary edge member of the first slot antenna forms an edge of the second trough antenna element. The slot antenna element acts as a wave-trap for radiation from the trough antenna element. The slot antenna elements balance EM mode-transformation from trough antenna elements: Transverse Electric (TE)-mode (surface-wave) into Transverse Electromagnetic (TEM)-mode (radiation into free-space).

In a further possible implementation form of the antenna system according to the preceding possible implementation form, a shape of the first slot antenna is tapered inward from the rear boundary edge member towards a front outer edge of the first trough antenna element and a width of the first trough antenna element is narrowed from the back wall member towards the front outer edge of the first trough antenna element. The trough antenna elements act as wave-traps for radiation from slot antenna elements and are used to balance EM mode-transformation of slot antennas: TM-mode (surface-wave) into TEM-mode (radiation into free-space). The array of slot antennas provides high-efficiency beamforming with mutual isolation of less than approximately −15 dB between adjacent slot antennas. Due to the small size of the elements, two polarization elements require a period of array to be ½ of the desired wavelength.

In a further possible implementation form of the antenna system according to the first aspect or any one of the preceding possible implementation forms, the back wall member comprises a plurality of conductive vias disposed between and electrically connecting the first planar conductive member and the second conductive member. The use of conductive vias provides for low-cost PCB (Printed Circuit Board) fabrication for the antenna system.

In a further possible implementation form of the antenna system according to the previous possible implementation form, the plurality of conductive vias form at least the first boundary edge member and the second boundary edge member of the first slot antenna. The use of conductive vias as the boundary members of the slot antenna provides for low-cost PCB fabrication for the antenna system.

In a further possible implementation form of the antenna system according to the first aspect or according to any one of the preceding possible implementation forms of the first aspect, the second conductive member is connected with at least a first step member and at least a second step member disposed in a staircase arrangement. The antenna system of the disclosed embodiments is compatible with metal frame mobile devices. The staircase arrangement of step members acts as a waveguide and maximizes the performance of the mmWave antenna of the disclosed embodiments by coupling it with the metal frame of the mobile device and minimizing parasitic feedline length and parasitic effects of the phone components.

In a further possible implementation form of the antenna system according to the previous possible implementation form, the second conductive member comprises a plurality of conductive vias disposed between and electrically connecting the second conductive member, the at least first step member and the at least second step member. The use of conductive vias provides for low-cost PCB fabrication for the antenna system.

In a further possible implementation form of the antenna system according to the first aspect, a feed line is connected to the first slot antenna and configured to generate an electric field polarized substantially parallel to the front outer edge of the first trough antenna element. The antenna system of the disclosed embodiments supports dual polarization beamforming, enabling dual layers MIMO/diversity in LOS channel.

In a further possible implementation form of the antenna system according to the first aspect or according to any one of the preceding possible implementation forms, a conductive member is coupled with the conductive probe, the conductive member being stacked between and spaced apart from the first planar conductive member and the second conductive member. The antenna system of the disclosed embodiments is a low-profile antenna system, and a reduced total height of the trough antenna elements enables integration within a mobile device. The array of trough antenna elements provides high-efficiency beamforming with greater than approximately 20% relative bandwidth (24.25 GHz- 29.5 GHz).

In a further possible implementation form of the antenna system according to the first aspect or according to any one of the preceding possible implementation forms, external conductive members are coupled to an outer side of the second conductive member in proximity to the front outer edge of the first trough antenna element. The antenna system of the disclosed embodiments is a low-profile antenna system, and a reduced total height of the trough antenna elements enables integration within a mobile device. The array of trough antenna elements provides high-efficiency beamforming with greater than approximately 20% relative bandwidth (24.25 GHz-29.5 GHz).

According to a second aspect, the above and further objects and advantages are obtained by a mobile device. In one embodiment, the mobile device comprises an antenna system according to any one of the preceding possible implementation forms. A mobile device with the antenna system of the disclosed embodiments supports mmWave bands for 5G mobile communications.

In a possible implementation form of the mobile device according to the second aspect, the mobile device comprises an outer edge, and the antenna system is allocated in proximity to the outer edge of the mobile device. The outer edge of the first trough antenna element is disposed substantially parallel to the outer edge of the mobile device. A mobile device incorporating the antenna system of the disclosed embodiments supports omnicoverage beamforming and beamscanning for stable connectivity performance at various user scenarios. The mmWave antenna gain and beam scan coverage are maximized by allocation of the mmWave radiating element at the edge of the mobile device.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
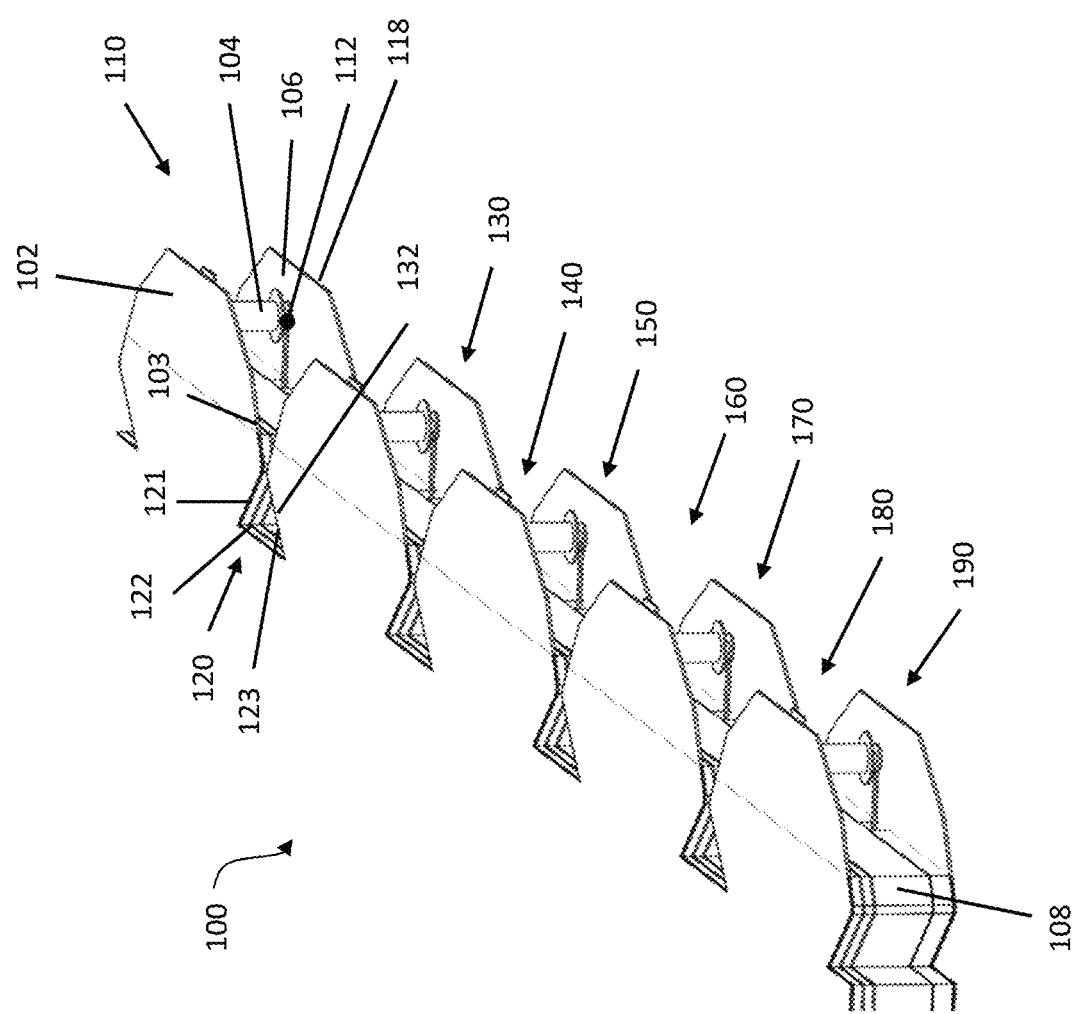
FIG. 1 is a top perspective view of an exemplary antenna system incorporating aspects of the disclosed embodiments.
Figure 12:
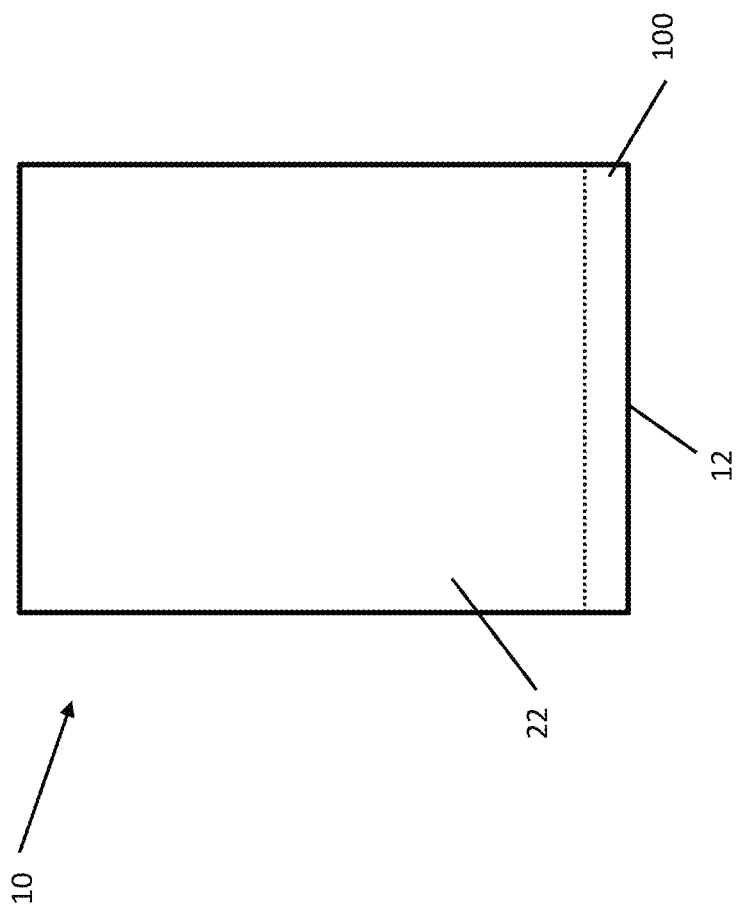
FIG. 12 is a schematic block diagram of an exemplary mobile device configured with an antenna system incorporating aspects of the disclosed embodiments.

Referring to FIG. 1, there can be seen an exemplary schematic block diagram of an antenna array or system 100 for an exemplary mobile communication device 10, such as that shown in FIG. 12, incorporating aspects of the disclosed embodiments. The antenna system 100 of the disclosed embodiments provides an antenna array that is a dual polarization endfire antenna device, where the period of the dual-polarization endfire antenna array is less that the wavelength of the generated electromagnetic waves. The antenna system 100 of the disclosed embodiments, when incorporated in a mobile device 10, is configured to support 5G mobile communication, omnicoverage beamforming with generally constant Equivalent Isotropically Radiated Power (EIRP)/Effective Isotropic Sensitivity (EIS), antenna diversity and multiple-in, multiple-out (MIMO) performance to achieve stable communication in all directions and orientations.

The aspects of the disclosed embodiments provide an antenna array or system 100 for a mobile device 10 that will radiate two distinct polarization modes and support beam forming for each and different polarization. The vertically polarized antennas, also referred to herein as trough antennas or trough antenna elements 110, are formed by the first conductive members 102 and second conductive members 106, which are fed by the conductive probe member 104. The horizontally polarized antennas, also referred to as slot antennas or slot antenna elements 120, are formed by the edges 121, 122, 123 of the conductive members 102, 106. The vertically polarized antennas and the horizontally polarized antennas are complementary with each other and not separable. The horizontally polarized antenna elements will improve isolation between vertically polarized antenna elements.

In the example shown in FIG. 1, the antenna system 100 includes at least one trough antenna element 110 and at least one slot antenna 120. The at least one trough antenna element, 110, referred to in this example as the first trough antenna element 110, is formed by a first conductive member or layer 102 and a second conductive member or layer 106. In the embodiment shown in FIG. 1, the first conductive member 102 is generally a substantially planar member. The second conductive member 106 can also be a substantially planar member. In alternate embodiments, the first conductive member 102 and the second conductive member 106 can be substantially planar or non-planer. For example, as is described further herein, the second conductive member 106 can comprise or be connected to, a conductive member configured in a step or staircase arrangement.

In the example shown in FIG. 1, the second conductive member 106 is spaced apart from the first planar conductive member 102. A back wall member 108 is disposed between the first planar conductive member 102 and the second conductive member 106. The vertically polarized antennas of the antenna system 100 are formed by the trough antenna elements, which contain conductive probes as described further herein.

In the example of FIG. 1, the at least one slot antenna 120, referred in this example as the first slot antenna 120, is formed in the first planar conductive member 102 and the second conductive member 106. As is shown in FIG. 1, the first slot antenna 120 extends through both conductive members or layers 102, 106 and is disposed adjacent to the first trough antenna element 110. The horizontally polarized antennas of the antenna system 100 are formed by the slot antennas, generally referred to as slot antennas 120. The first slot antenna 120 extends from a back edge 122 along the back wall 108 to a front edge 118 of the structure of the antenna system 100.

As is illustrated in the example of FIG. 1, the antenna system 100 includes at least a second trough antenna element 130 and at least a second slot antenna 140. The second trough antenna element 130 is disposed between the first slot antenna 120 and a second slot antenna 140. In the example of FIG. 1, the second trough antenna element 130 is disposed adjacent to the second slot antenna 140. Although the aspects of the disclosed embodiments will generally be described herein with respect to first and second trough antenna elements 110, 130, and first and second slot antennas 120, 140, the aspects of the disclosed embodiments are not so limited. In alternate embodiments, the antenna system 100 can include any number of trough antenna elements, such as trough antenna elements 110, 130, 150, 170 and 190, generally referred to as trough antenna elements 110. Similarly, the antenna system 100 can include any number of slot antennas, such as slot antennas 120, 140, 160 and 180, generally referred to as slot antennas 120. In one embodiment, the number of trough antenna elements 110 and slot antennas 120 is dependent upon a size and application of the antenna system 100 and mobile device 10 illustrated in FIG. 12.

Figure 2:
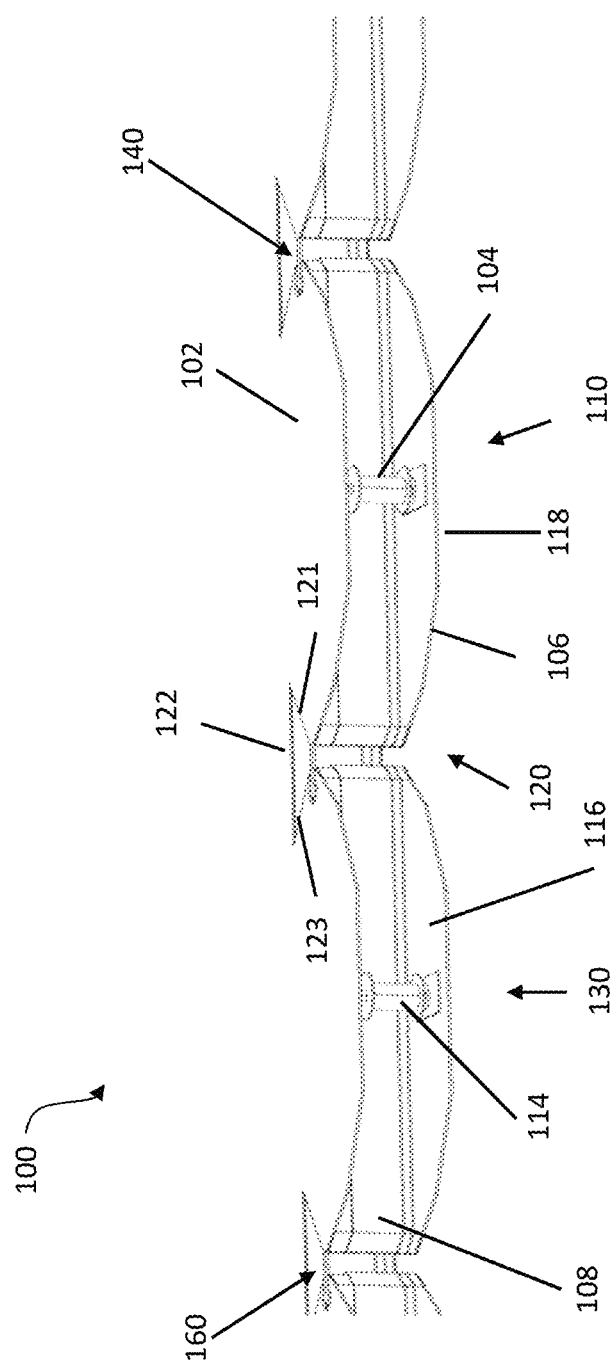
FIG. 2 is a partial front perspective view of the antenna system illustrated in FIG. 1.

Additionally, while the second slot antenna 140 is described herein as being adjacent to the second trough antenna element 130, the aspects of the disclosed embodiments are not so limited. In alternate embodiments, the second slot antenna 140 can be formed adjacent to any one of the trough antenna elements of the antenna system 100. For example, as is shown in FIG. 2, the second slot antenna 140 is shown adjacent to the first trough antenna element 110. Generally, as is shown in FIGS. 1 and 2, the antenna system 100 comprises a slot antenna 120 adjacent to a trough antenna element 110 or disposed between two trough antenna elements, depending upon a size and configuration of the antenna system 100. Similarly, a trough antenna element 110 will be disposed adjacent to a slot antenna 120 or disposed between two slot antennas, depending upon a size and configuration of the antenna system 100.

Referring to FIGS. 1 and 2, in one embodiment, the antenna system 100 includes a conductive probe member 104. The conductive probe member 104 is configured to generate an electric field that is generally polarized in a substantially perpendicular manner relative to the edge 118 of the trough antenna element 110. The edge 118 will generally be referred to as a front edge of the antenna system 100. As shown in the example of FIG. 1, the conductive probe member 104 is disposed between the first planar conductive member 102 and the second conductive member 106. In one embodiment, the conductive probe member 104 is positioned substantially perpendicularly relative to the first planar conductive member 102 and the second conductive member 106. As illustrated also in FIG. 2, the conductive probe member 104 is disposed in front of the back wall member 108. As will be further described herein, the back wall member 108 is generally configured as a reflector for the conductive probe member 104.

Figure 13:
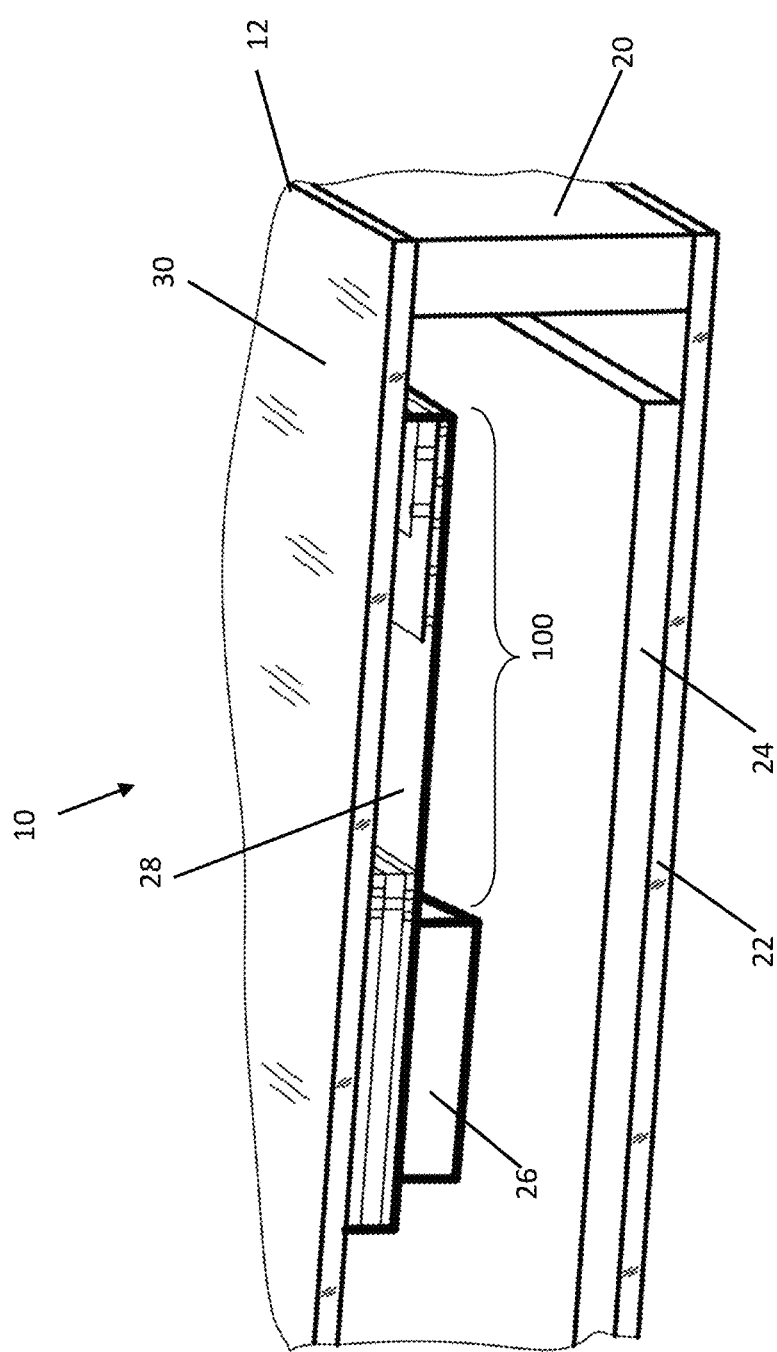
FIG. 13 is a side cross-sectional schematic view of an exemplary mobile device incorporating an antenna system of the disclosed embodiments.

The slot antennas, such as slot antennas 120 and 140 in FIG. 2 are generally disposed between adjacent conductive probe members, such as conductive probe members 104, 114. The conductive probe members 104, 114 in the example of FIGS. 1 and 2 are generating traveling electromagnetic waves along the edges 116 118 of the trough antenna elements 110, 130, 150 and therefore along the outer edge 12 of the mobile device 10 shown in FIG. 12, for example. In FIGS. 12 and 13, the antenna system 100 is shown adjacent to an outer edge 12 of the mobile device 10. The outer edge 12 can include any one or more of the top, bottom, left or right side of the mobile device 10. In FIG. 12, the outer edge 12 runs along a bottom of the device 10, while in FIG. 13, the outer edge runs along the back of the device 10. The radiation of the traveling electromagnetic waves into free space is controlled by a geometry of the corresponding slot antennas 120.

Figure 3:
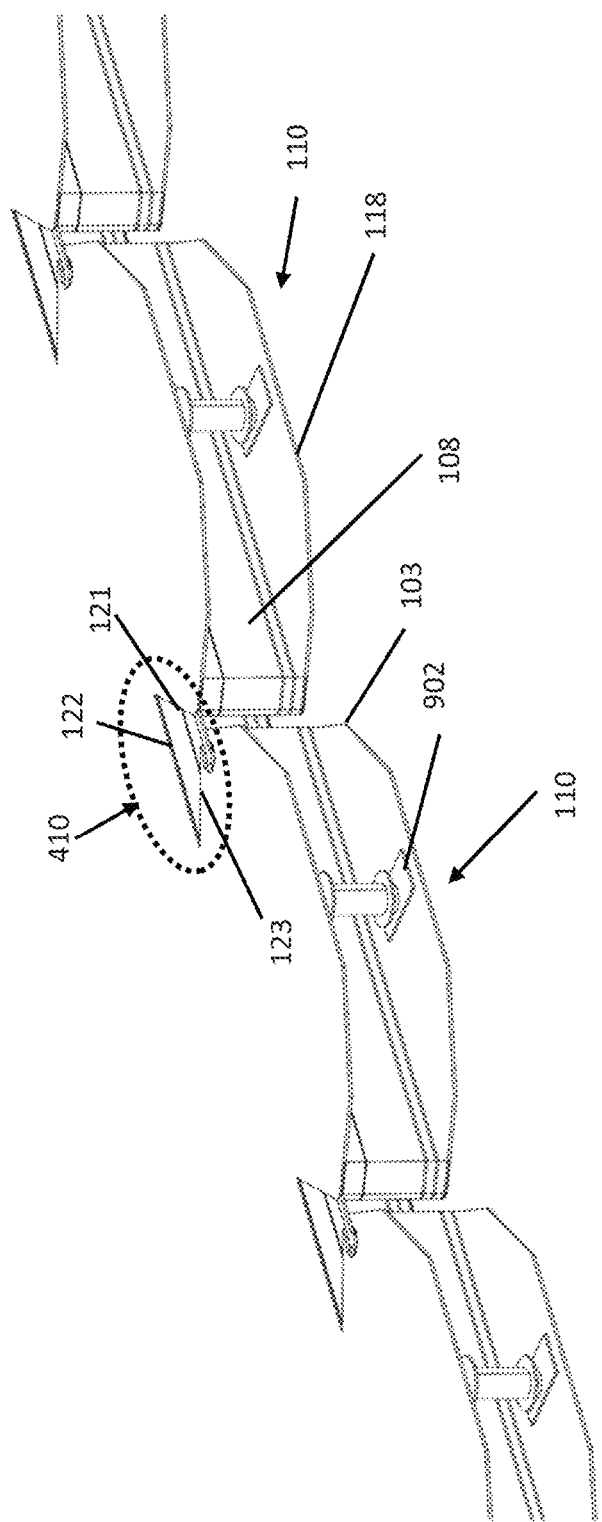
FIG. 3 illustrates a bottom perspective view of the antenna system illustrated in FIG. 1.

FIGS. 2 and 3 illustrates an exemplary geometry of a slot antenna, such as slot antenna 120. FIG. 2 illustrates a front perspective view, while FIG. 3 illustrates a bottom perspective view. In this example, a shape 410 of the slot antenna 120 is generally tapered and is generally defined by a first boundary edge member 121, a second or rear boundary edge member 122, and a third boundary edge member 123. In the example of FIG. 3, the first boundary edge member 121 of the first slot antenna 120 forms or is coincident with an edge 103 of the first trough antenna element 110. As also shown in FIG. 3, the second boundary edge member 123 of the first slot antenna 120 forms an edge 132 of or is coincident with the second trough antenna element 130. Both the first boundary edge member 121 and the third boundary edge member 123 extend towards the front edge 118 of the trough antenna 110 and antenna system 100.

In the example of FIG. 3, the exemplary shape 410 of the slot antenna 120 is tapered inward from the rear boundary edge member 122 towards the front outer edge 118 of the trough antenna element 110. As is also shown in FIGS. 1-3, a width of the trough antenna element 110 is narrowed from the back wall member 108 towards the front outer edge 118 of the trough antenna element 110. The shapes of the slot antennas 120 and the trough antenna elements 110 in the antenna array 100 provides for high efficiency beam forming and beam scanning.

Figure 4:
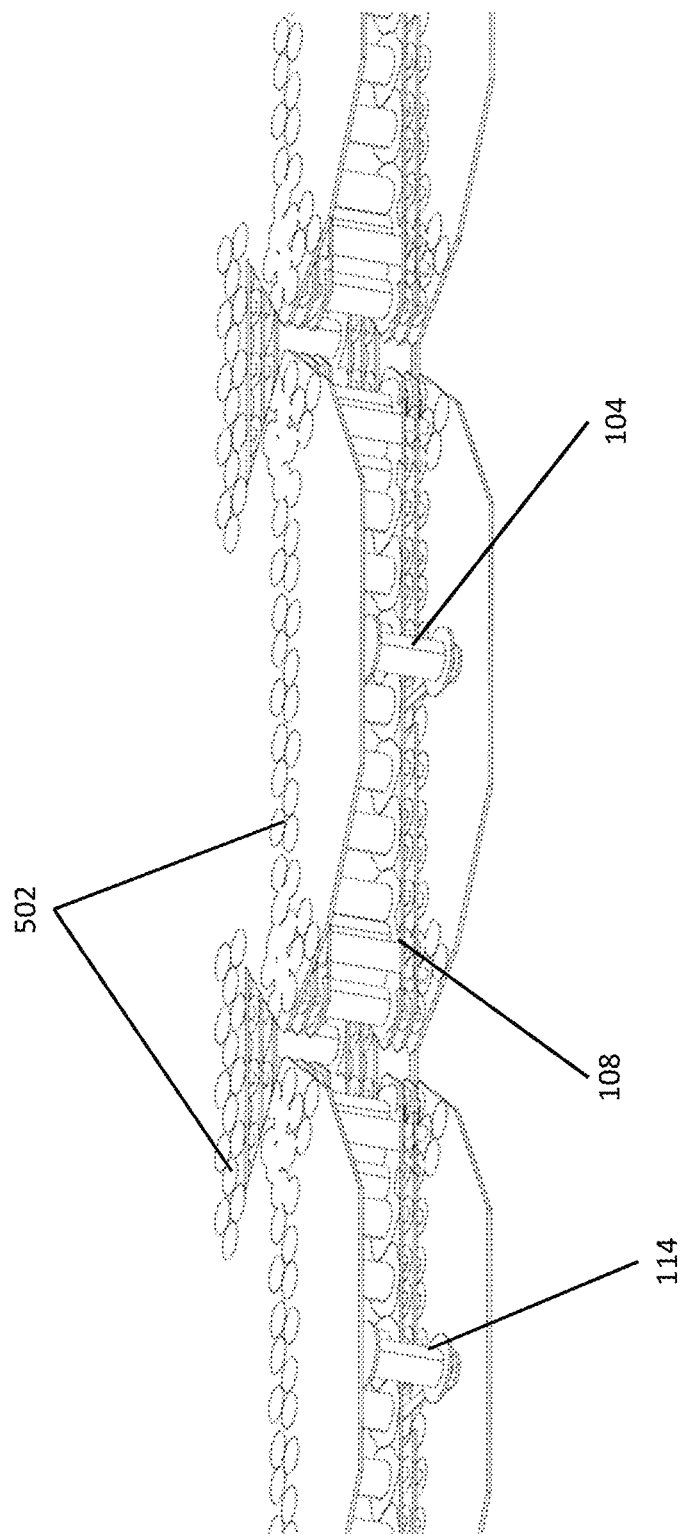
FIG. 4 is a schematic perspective view of an exemplary antenna system incorporating aspect of the disclosed embodiments illustrating the conductive vias.
Figure 5:
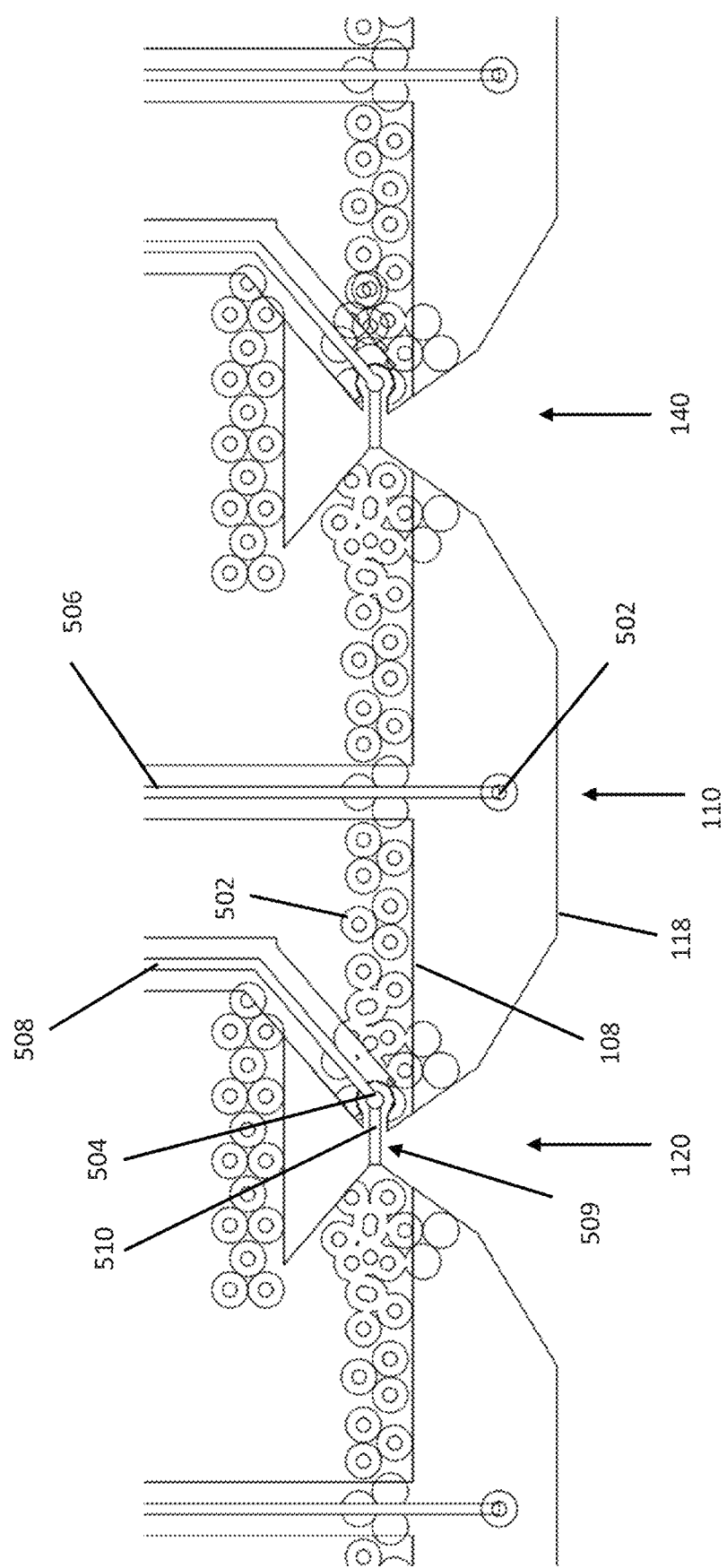
FIG. 5 is a top plan view of an exemplary antenna system incorporating aspect of the disclosed embodiments illustrating conductive vias and feed lines.

In one embodiment, referring also to FIGS. 4 and 5, the back wall member 108 comprises a plurality of conductive vias or via holes 502. In this example, the conductive vias 502, are disposed between and electrically connect the first planar conductive member 102 and the second conductive member 106. In one embodiment, the plurality of conductive vias 502 form the first boundary edge member 121 and the second boundary edge member 123 of the slot antenna 120. The conductive vias 502 can have one or more of regular or irregular shapes. In one embodiment, the conductive vias 502 can be filled with a conductive material such as copper, for example.

Referring to FIG. 5, in one embodiment, the antenna system 100 includes two distinct antenna feed lines 506, 508 and connection points 502, 504, one for each trough antenna element 110 and another for each slot antenna 120. In the example of FIG. 5, connection point 502, which is connected to or part of feed line 506, is coupled or connected to conductive probe member 104 of the trough antenna element 110. Connection point 504, which is connected to or part of the feed line 508, is coupled to or connected to the slot antenna 120. The two distinct connections enable dual-polarization radiation or beam forming. For the purposes of the description herein, the connection point 502 and feed line 506 will be collectively referred to as feed line 506, and the connection point 504 and feed line 508 will be collectively referred to as feed line 508. In one embodiment, in a PCB based antenna array, the feed line 506 and the feed line 508 comprise striplines.

In the example of FIG. 5, the feed line 508 crosses the slot antenna 120 at an approximate midpoint 509 of the slot antenna 120. The feed line 508 includes a transition 510 of the stripline to the slot antenna 120. In one embodiment, the first slot antenna 120 includes a radial stub near the connection point 504 and transition 510 of the feedline 508, as that is generally understood. The feeding position, radial stub and the size of the impedance matching topology are tuned to provide good impedance matching. In this example, the connection of the feed line 508 to the slot antenna 120 can generate an electric field that is generally polarized in a substantially parallel manner relative to the edge 118 of the trough antenna element 110.

The plurality of trough antenna elements 110 and slot antennas 120 shown in FIG. 1, generally form a dual polarization endfire antenna device, or antenna system 100. The specific trough antenna elements 110, 130, 150, 170 and 190, slot antennas 120, 140, 160 and 180 and adjacent conductive probes 104, are generally configured as a plurality of slotted trough antenna elements, generating dual-polarization radiation. The dimensions of the slotted trough antenna elements are generally characterized as a distance between adjacent slots 120, 140 and/or a distance between adjacent conductive probe members 104, 114. The dimensions generally define the period of the antenna system 100 formed by the plurality of slotted trough antenna elements. The polarization-MIMO beamforming can be performed by phase-controlled feeding of the slot antennas 120, 140 and respective conductive probe members 104, 114, for example.

In one embodiment, referring to FIGS. 12 and 13, as is generally understood, a typical mobile device 10, such as a mobile phone, can include a metal frame 20, a front glass cover 22, a display 24 and a back or glass cover 30. As shown in the example of FIG. 13, the internal structure of the mobile device 10 also includes a radio frequency integrated circuit 26 (RFIC), and the antenna system 100. In the example of FIG. 13, the antenna system 100 of the disclosed embodiments is formed on a printed circuit board 28, referred to herein as antenna PCB structure 28. The antenna PCB structure 28 of the disclosed embodiments can be configured to provide a dual polarization mmWave antenna system 100 for the metal frame mobile device 10.

FIG. 13 illustrates a cross-section of the mobile device 10, showing the position of the antenna system 100 relatively to the display 24, the front cover 22 and the back cover 30. As shown in FIG. 13, the antenna system 100 is allocated in proximity or adjacent to the back cover 30. In the example of FIG. 13, the dual-polarization antenna elements described herein are formed by the antenna PCB structure 28, which is coupled with the back or glass cover 30 and the metal frame 20. The antenna PCB structure 28 coupled with the back or glass cover 30 and the metal frame 20 of the mobile device 10 form dual-polarization leaky-wave beamforming and beam steering structures. The dual polarization electromagnetic modes propagate alongside the antenna PCB structure 28, the back or glass cover 30 and the metal frame structure 20 and radiate into free space.

Figure 6:
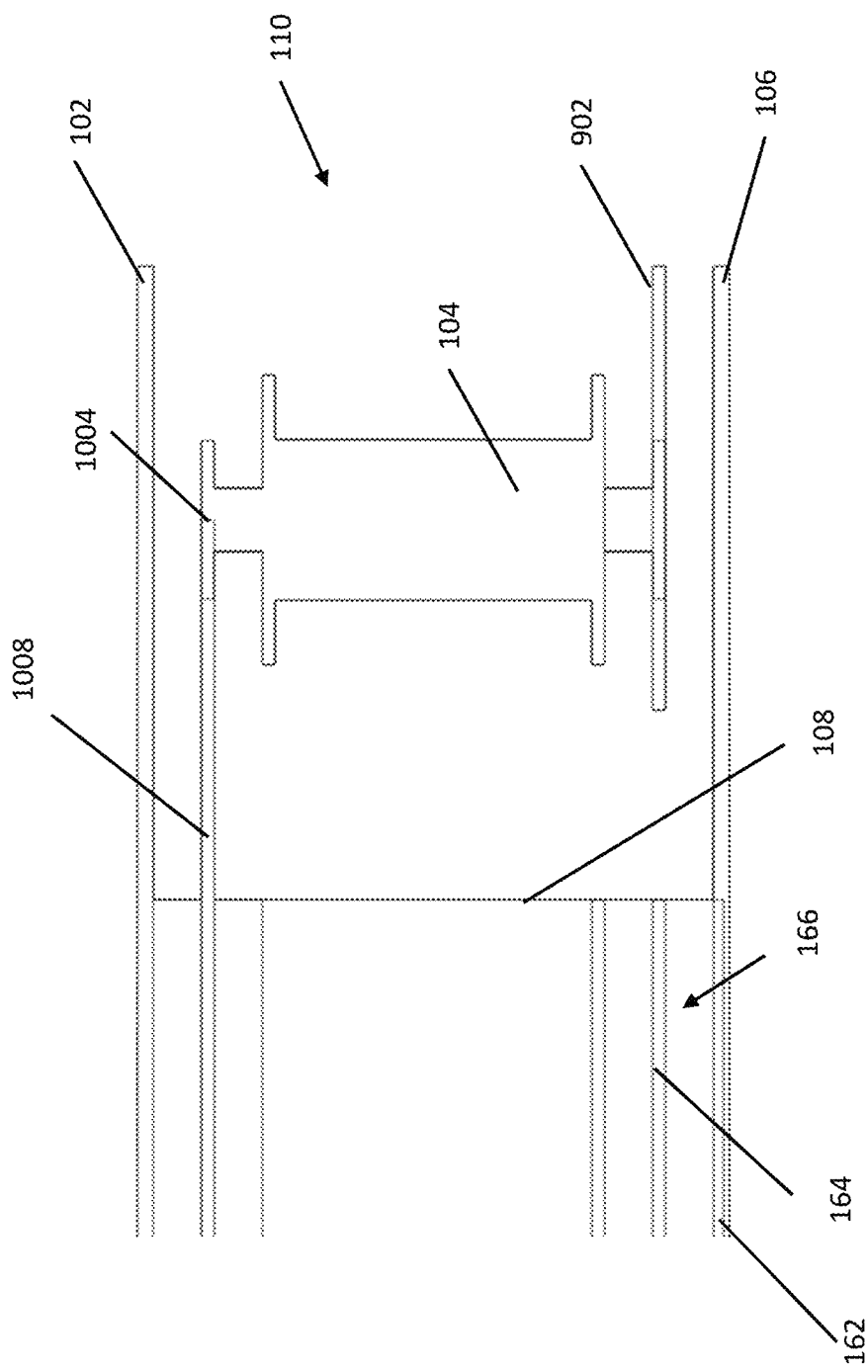
FIG. 6 is a side cross-sectional view of a trough antenna of an antenna system incorporating aspects of the disclosed embodiments.
Figure 7:
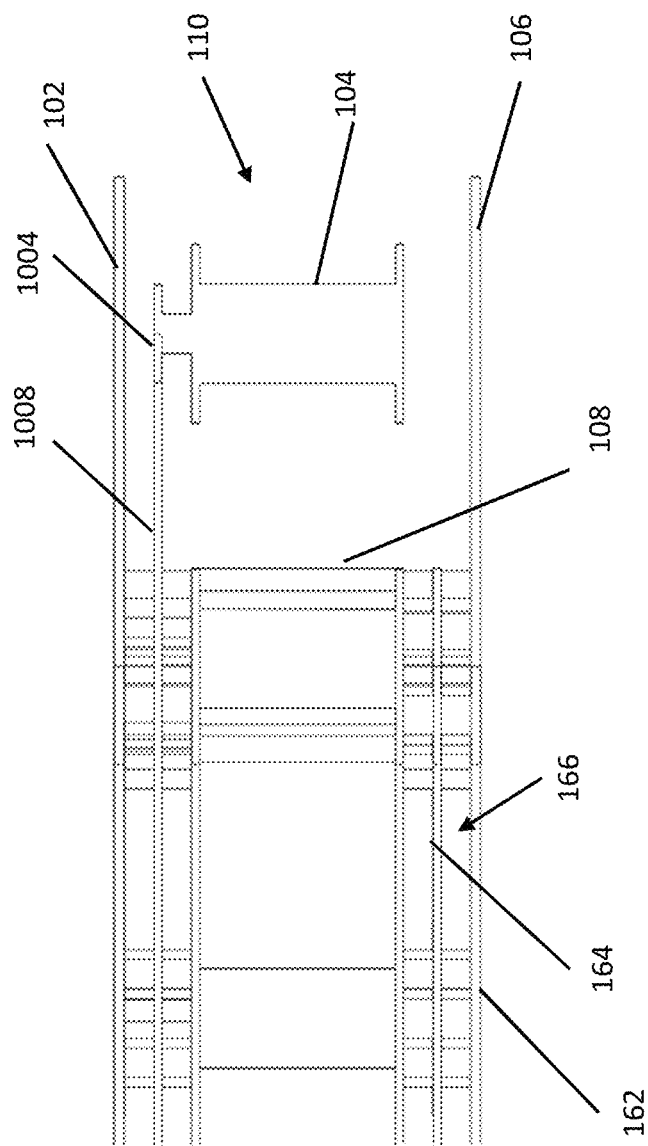
FIG. 7 is a cross-sectional view of an exemplary trough antenna incorporating aspects of the disclosed embodiments.

In one embodiment, referring to FIGS. 6-9, the second conductive member 106 comprises or is connected to at least a first step member or layer 162 and at least a second step member or layer 164. Each step member 162, 164 generally comprises a conductive layer or element. Step members 162, 164 are interconnected with multiple conductive vias 165, similar to conductive vias 502. The density of conductive vias 165 allocation provides radio frequency currents flow along surfaces of the second conductive member 106 in the step or staircase arrangement. As illustrated in FIGS. 6 and 7, there is a gap 166 between the first step member 162 and the second step member 164. The gap 166 is generally filled with a dielectric, such as air.

Figure 8:
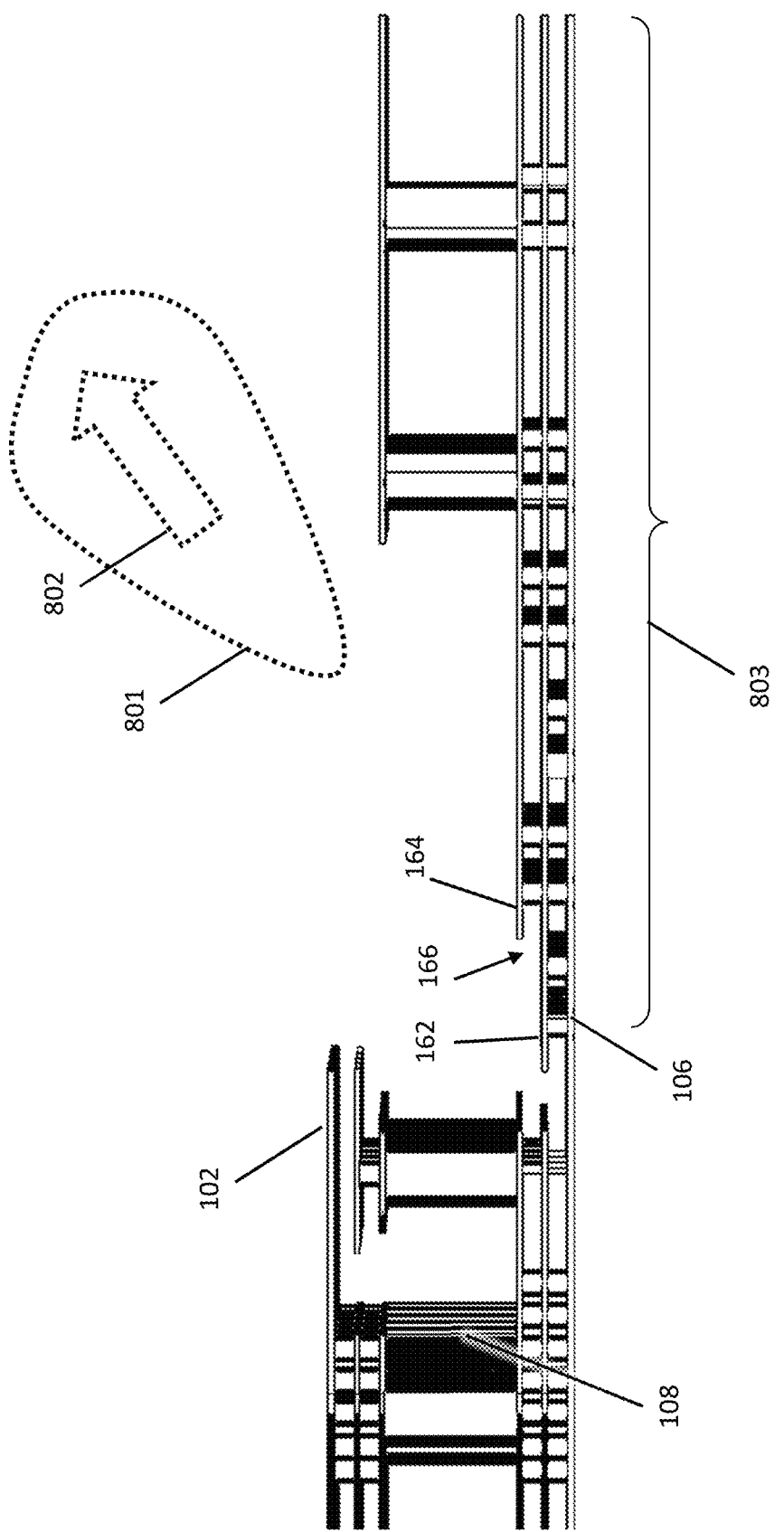
FIG. 8 is a cross-sectional view of a trough antenna for an exemplary antenna system incorporating aspect of the disclosed embodiments.
Figure 9:
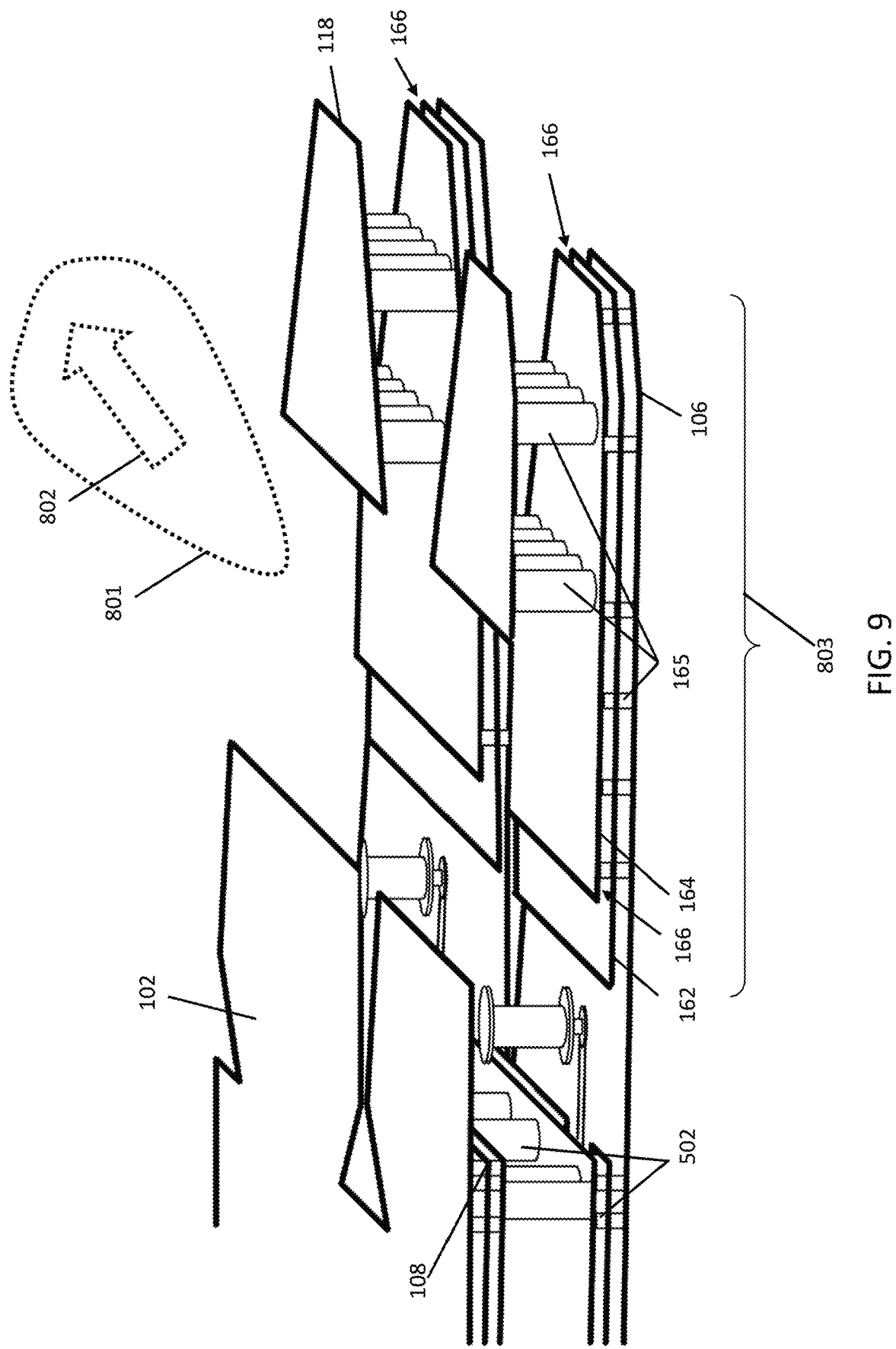
FIG. 9 is a perspective schematic view of an internal structure of an exemplary antenna system incorporating aspects of the disclosed embodiments.

In one embodiment, as shown in the example of FIGS. 8 and 9, the first step member 162 and the second step member 164 are shown interconnected with multiple vias 165, configured in a step or staircase arrangement. The staircase arrangement of step members 162, 164 acts as a dual-polarization leaky-wave waveguide and maximizes the performance of the mmWave antenna assembly 100 of the disclosed embodiments by coupling it with the metal frame 20 of the mobile device 10 and minimizing parasitic feedline length and parasitic effects of the phone components. The direction of propagation of the traveling wave in the examples of FIG. 6-9 is left to right. In the example of FIG. 9, the direction of propagation extends from the back wall 108 towards the front edge 118, and then into free space.

Referring to FIGS. 8 and 9, step members 162, 164 are configured as dual-polarization traveling-wave antennas with a leaky-wave radiating aperture 803. A tapered distance between the conductive step members 162, 164 and the free space defines tapered phase and leakage rates of the leaky wave alongside the leaky-wave radiating aperture 803. Thus, the radiation pattern 801 and direction of propagation 802 are defined by geometry of the step members 162, 164 and by dielectric properties of materials separating the antenna structures from the free space.

Figure 10:
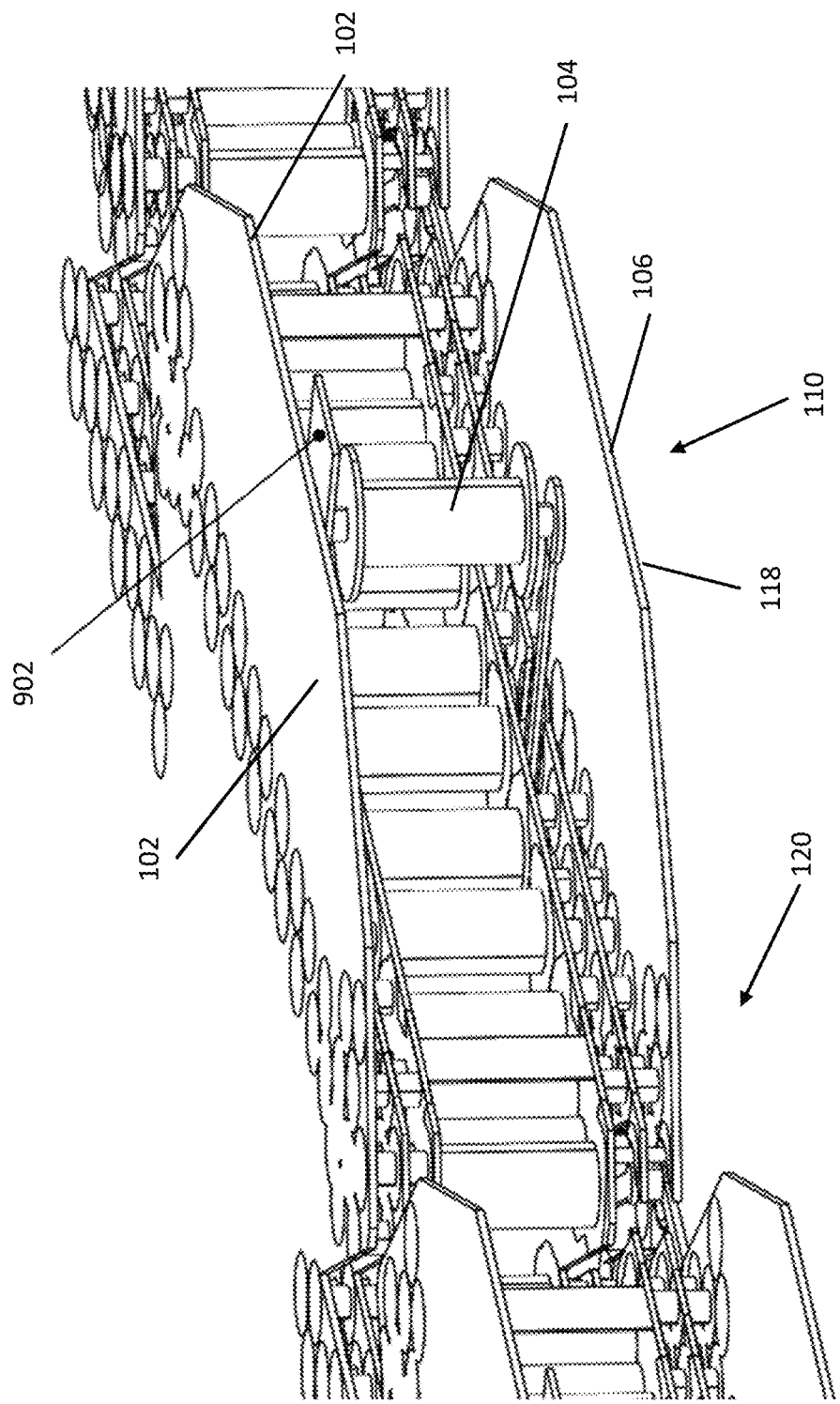
FIG. 10 is a perspective schematic view of an exemplary trough antenna for an antenna system incorporating aspect of the disclosed embodiments.

Referring to FIG. 10, in one embodiment, the antenna system 100 includes a conductive member 902 coupled with the conductive probe 104. Conductive member 902 is configured for capacitive coupling between the conductive probe 104 and the first planar conductive member 102. The dimensions of the conductive probe 104 and the conductive member 902 are selected such that the overall impedance bandwidth of the first trough antenna element 110 is maximized. In this example, the conductive member 902 is stacked between and spaced apart from the first planar conductive member 102 and the second conductive member 106.

Figure 11:
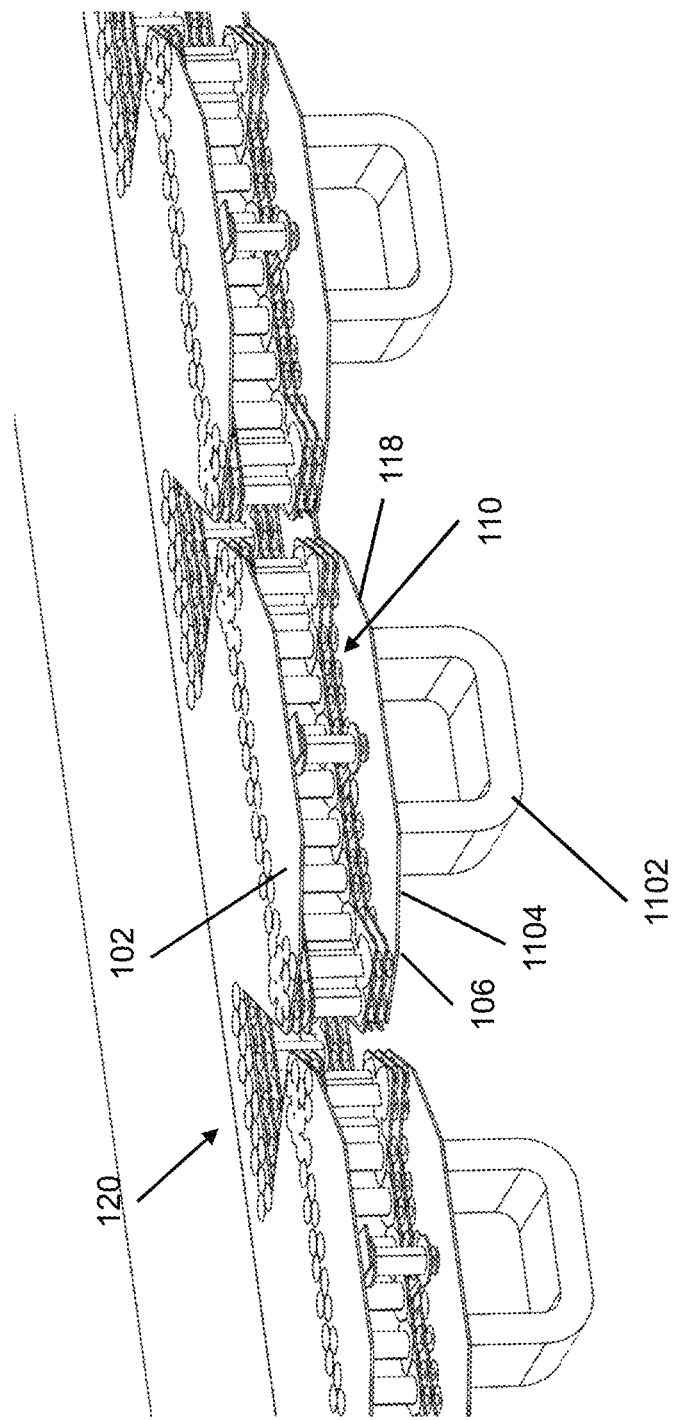
FIG. 11 is a schematic front perspective view of an exemplary antenna system incorporating aspects of the disclosed embodiments.

FIG. 11 illustrates another exemplary antenna system incorporating aspects of the disclosed embodiments. In this example, the antenna system 100 includes one or more external conductive members 1102 coupled to an outer side 1104 of the second conductive member 106. In this example, the external conductive member 1102 is disposed in proximity to the front outer edge 118 of the first trough antenna element 110. The external conductive member 1102 is configured as a surface-mount component. In other embodiments, the external conductive member 1102 is configured as conductive part of the separate structure: for example, a conductive pattern on Laser Direct Structuring (LDS) dielectric materials, or a conductive pattern formed within another PCB or flexible PCB. The external conductive member 1102 is configured to effectively increase a height of the first trough antenna element 110, further increasing an impedance bandwidth and radiation efficiency of the first trough antenna element 110.

Figure 14:
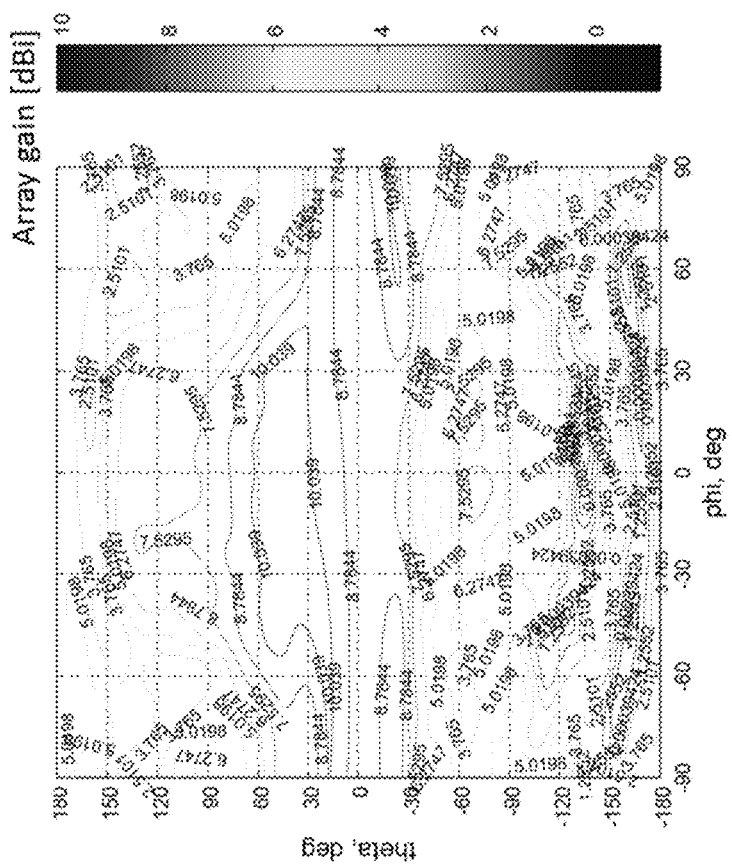
FIG. 14 are plots illustrating dual-polarization scan coverage for an antenna system incorporating aspects of the disclosed embodiments.
Figure 14:
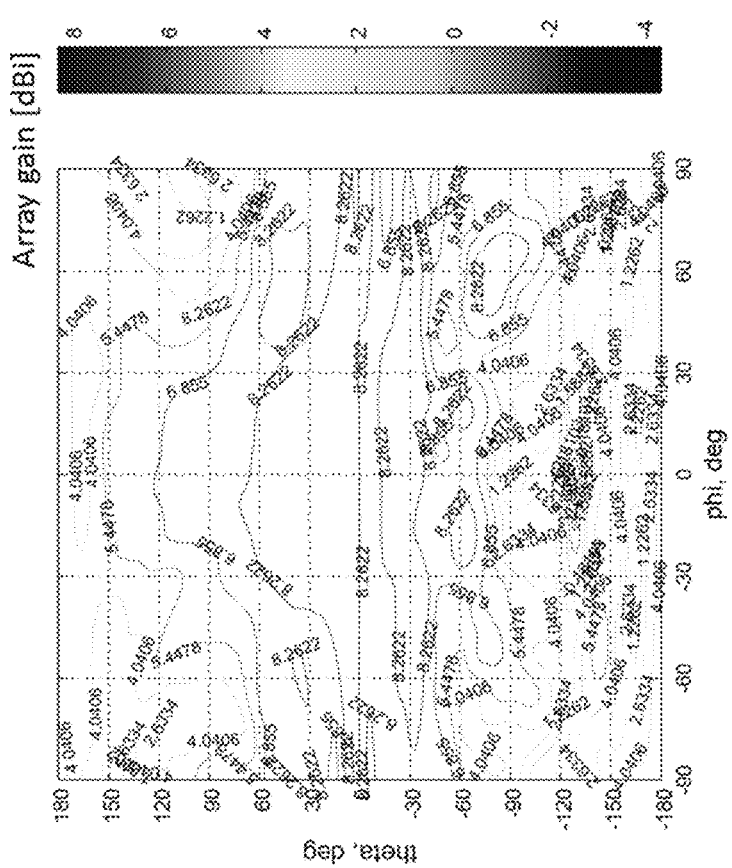
Figure 15:
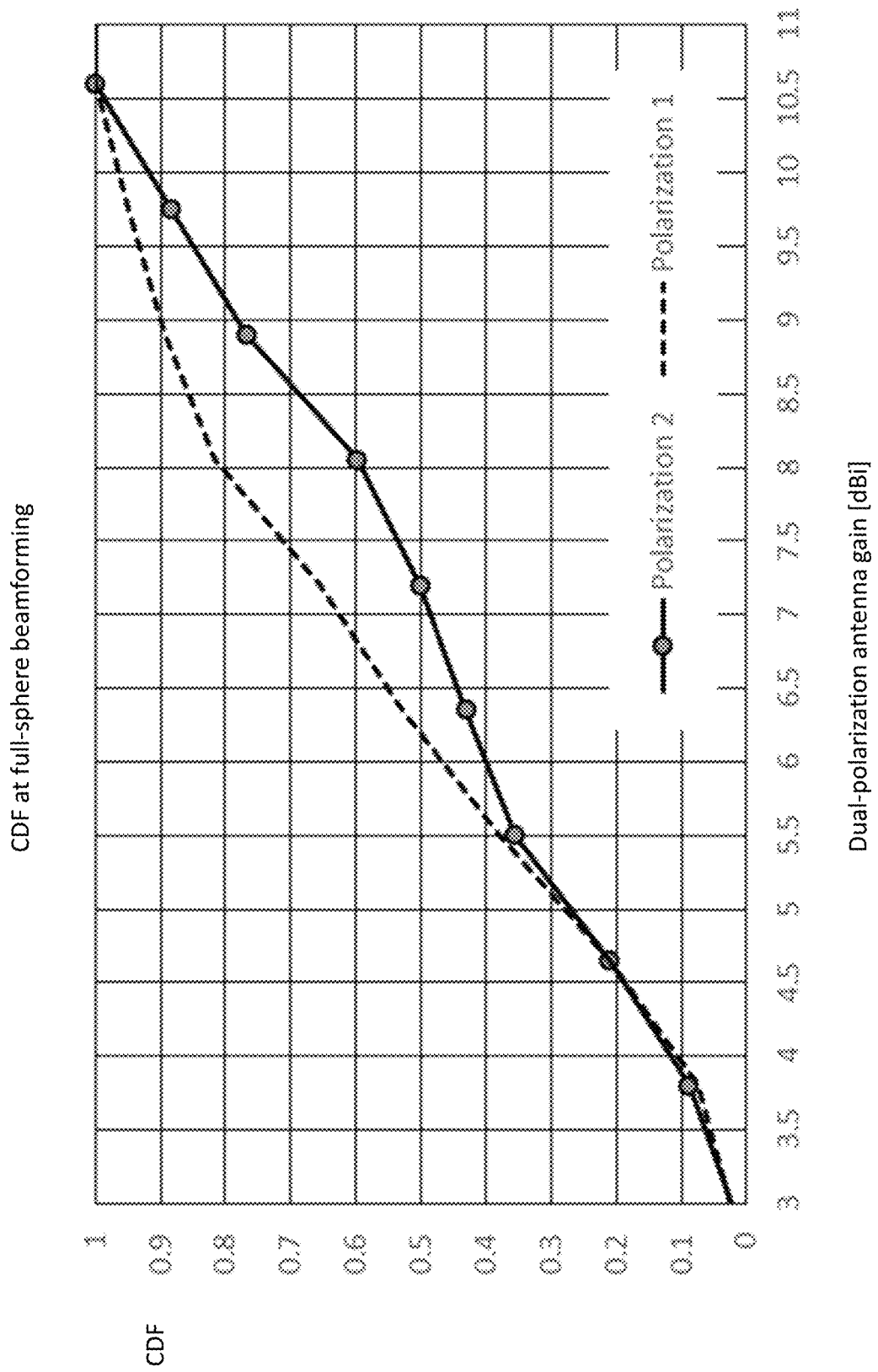
FIG. 15 is a graph illustrating antenna gain for an antenna system incorporating aspects of the disclosed embodiments.

FIGS. 14 and 15 illustrate the exemplary performance of the antenna system 100 of the disclosed embodiments supporting diversity/MIMO rank 2 full sphere coverage. The antenna system 100 of the disclosed embodiment for the mobile device 10 has omnicoverage dual-polarization beamforming and beam scanning. As shown in the graphs of FIGS. 14 and 15, the exemplary antenna array 100 with dual-polarization beamforming can be characterized by the cumulative distribution function (CDF) of antenna gain.

FIG. 14 illustrates dual-polarization beam forming for the exemplary mobile device 10 with the disclosed antenna array 100. In the example of FIG. 14, the realized gain is plotted in spherical coordinates for each spatial direction beam setting. Orthogonal polarizations 1 and 2 are radiated by the slot antenna elements 120 and the trough antenna elements 110, correspondingly.

Referring to FIG. 15, exemplary CDF curves for dual-polarization beamforming are illustrated. The CDF shown in FIG. 15 is captured by configuring the antenna array 100 to create a number of beams sequentially towards a number of spatial directions and measuring gain from corresponding directions. The curves of FIG. 15 illustrate that the minimum gain achieved for the full-sphere scan coverage exceeds 3.5 dBi (point CDF=0.2). The discrepancy between gain for orthogonal polarizations is below 1 dB, indicating a capability to support rank 2 MIMO performance at line-of-sight operation as well as rank 4 MIMO performance at non-line-of-sight operation.

Figure 16:
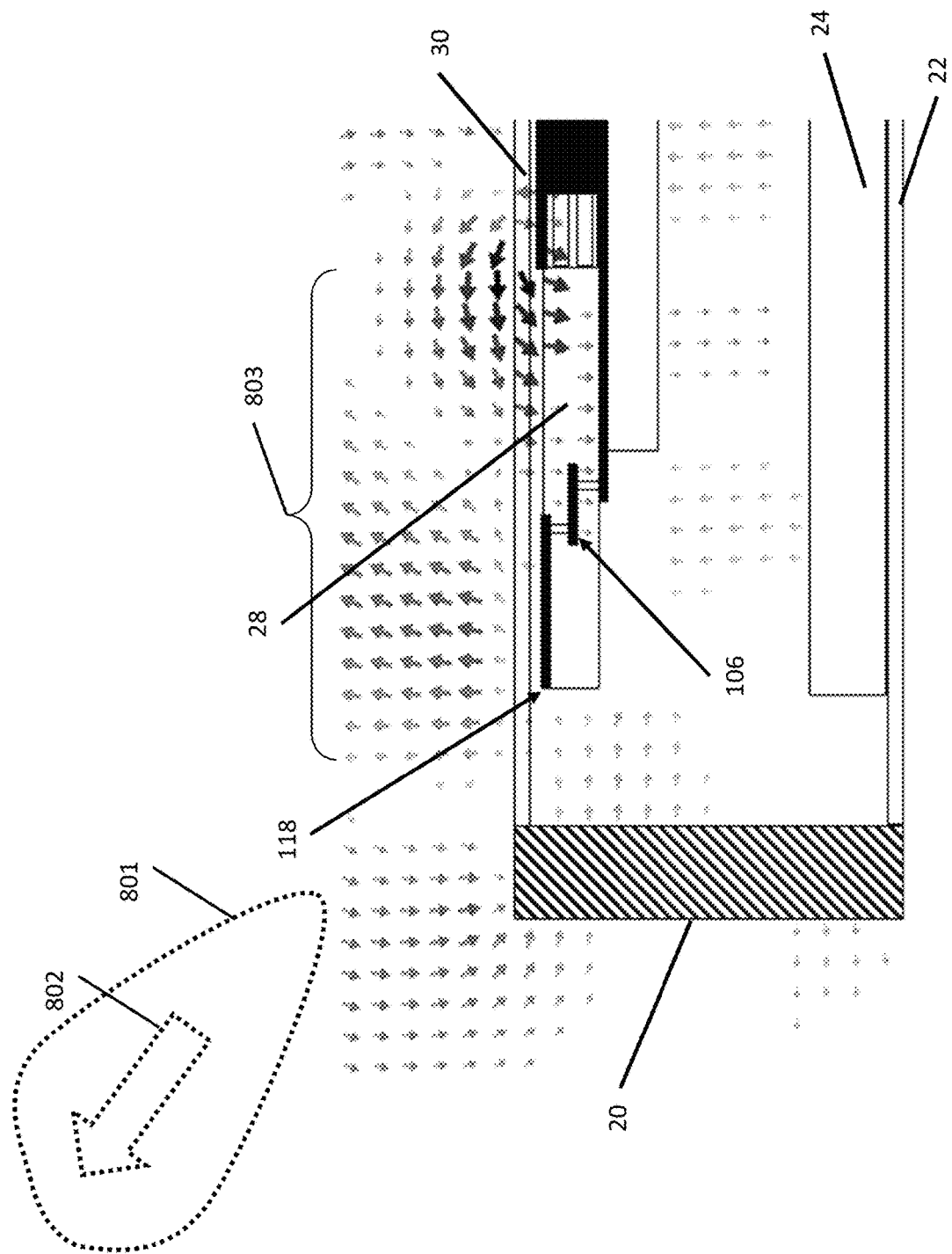
FIG. 16 illustrates an exemplary E-field for a mobile device incorporating an antenna system of the disclosed embodiments.

FIG. 16 illustrates an exemplary E-field with vertical polarization for the mobile device 10 that includes the dual-polarization mmWave antenna system 100 disclosed herein. In this example, the second conductive member 106 is disposed in the staircase arrangement, as is described with respect to FIGS. 6-9. The mobile device 10 includes a metal frame 20 and back glass cover 30, coupled with the antenna system 100. The radiation pattern 801 and direction of propagation 802 are defined by a geometry of the step members 162, 164 and by dielectric properties of the back glass cover 30. The staircase arrangement of the second conductive member 106 is configured to gradually increase leakage rates of the leaky wave alongside the leaky-wave radiating aperture 803.

Specifically, the second conductive member 106 is configured so that a greatest part of the electromagnetic energy is radiated into free space before reaching the front edge 118. Thus, the parasitic effect of the metal frame 20 on beamforming and beam scanning is minimized. Dual-polarization electromagnetic waves are radiated into free space avoiding parasitic coupling with the metal frame 20 and with inner dielectric-filled cavities within the mobile device 10. As illustrated in FIG. 16, an intensity of the E-field between the antenna system 100 and the display structures 24 is lower than intensity of E-field radiated into free space through the back glass cover 30.

The aspects of the disclosed embodiments provide an antenna system for a mobile device that will radiate two distinct polarization modes and support beam forming for each polarization. Dual-polarization beamforming is supported and two orthogonal polarizations are radiated. The vertically polarized antennas are formed by the conductive members and fed by conductive probe members. The conductive probe members are placed in front of a reflector formed by one row of conductive vias and connected with a stripline to RFIC output pins. The horizontally polarized antennas are formed by the slot antenna element at the edges of the planar conductive members. The vertically polarized antennas and the horizontally polarized antennas are complementary with each other and not separable.

The antenna system 100 of the disclosed embodiments provides a high-efficiency dual polarization-MIMO mmWave antenna that has greater than approximately 20% relative bandwidth in the frequency range of approximately 24.25 GHz-29.5 GHz and supports omnicoverage beamforming with generally constant EIRP/EIS, diversity/MIMO performance to achieve stable communication in all directions and orientations. The dual-polarization antenna array of the disclosed embodiments will generally occupy the same area on a printed circuit board as a single polarization array. Both types of antenna elements, the trough and tapered slots, are inherently wide-band. Isolation of greater than approximately −15 dB can be achieved by the orthogonality of current modes.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those element, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An antenna system for a mobile device, comprising:
   a first trough antenna element formed by:
     a first planar conductive member;
     a second conductive member spaced apart from the first planar conductive member; and
     a back wall member disposed between the first planar conductive member and the second conductive member; and
   a first slot antenna formed in the first planar conductive member and the second conductive member adjacent to the first trough antenna element,
   wherein the back wall member comprises a plurality of conductive vias disposed between and electrically connecting the first planar conductive member and the second conductive member.

2. The antenna system according to claim 1, wherein a second trough antenna element is formed between the first slot antenna and a second slot antenna adjacent to the second trough antenna element.

3. The antenna system according to claim 1, wherein the first trough antenna element comprises a conductive probe member disposed between the first planar conductive member and the second conductive member and in front of the back wall member.

4. The antenna system according to claim 3, wherein comprising a feed line connected to the conductive probe member to generate an electric field polarized substantially perpendicular to a front outer edge of the first trough antenna element.

5. The antenna system according to claim 1, wherein the first slot antenna is defined by a first boundary edge member, a second boundary edge member and a rear boundary edge member, and wherein the first boundary edge member of the first slot antenna forms an edge of the first trough antenna element and the second boundary edge member of the first slot antenna forms an edge of the second trough antenna element.

6. The antenna system according to claim 5, wherein a shape of the first slot antenna is tapered inward from the rear boundary edge member towards a front outer edge of the first trough antenna element, and a width of the first trough antenna element is narrowed from the back wall member towards the front outer edge of the first trough antenna element.

7. The antenna system according to claim 1, wherein the plurality of conductive vias form at least a first boundary edge member and a second boundary edge member of the first slot antenna.

8. The antenna system according to claim 1, wherein the second conductive member is connected to at least a first step member and at least a second step member disposed in a staircase arrangement.

9. The antenna system according to claim 8, wherein the second conductive member comprises a plurality of conductive vias disposed between and electrically connecting the second conductive member, the at least first step member and the at least second step member.

10. The antenna system according to claim 3, comprising a feed line connected to the first slot antenna and configured to generate an electric field polarized substantially parallel to a front outer edge of the first trough antenna element.

11. The antenna system according to claim 1, comprising a conductive member coupled with a conductive probe, the conductive member being stacked between and spaced apart from the first planar conductive member and the second conductive member.

12. The antenna system according to claim 1, comprising external conductive members coupled to an outer side of the second conductive member in proximity to a front outer edge of the first trough antenna element.

13. A mobile device comprising an antenna system according to claim 1.

14. The mobile device according to claim 13, the mobile device comprising an outer edge, wherein the antenna system is allocated in proximity to the outer edge of the mobile device, and an outer edge of the first trough antenna element is disposed substantially parallel to the outer edge of the mobile device.

* * * * *